(12) United States Patent
Tweet

(10) Patent No.: US 7,743,864 B2
(45) Date of Patent: Jun. 29, 2010

(54) TANDEM FOUR-WHEEL VEHICLE

(75) Inventor: Ole Tweet, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 444 days.

(21) Appl. No.: 10/415,704

(22) PCT Filed: Jul. 31, 2002

(86) PCT No.: PCT/US02/24341

§ 371 (c)(1),
(2), (4) Date: Aug. 11, 2003

(87) PCT Pub. No.: WO03/053769

PCT Pub. Date: Jul. 3, 2003

(65) Prior Publication Data

US 2004/0031640 A1    Feb. 19, 2004

(51) Int. Cl.
B62D 21/00    (2006.01)
(52) U.S. Cl. .................. 180/89.1; 180/312; 180/908
(58) Field of Classification Search ............... 180/89.1, 180/291, 312, 210, 215, 233, 908, 90.6, 311; 280/163, 291, 760; 296/75, 37.1; D12/107; 297/417, 195, 243; 224/408, 410, 413, 415, 224/425, 426, 275, 401
See application file for complete search history.

(56) References Cited

U.S. PATENT DOCUMENTS

| | | | | |
|---|---|---|---|---|
| 1,662,718 A * | 3/1928 | Regard | ...................... | 280/281.1 |
| 3,776,353 A * | 12/1973 | Roth | ........................... | 180/215 |
| 4,451,057 A * | 5/1984 | Lawson | ....................... | 280/291 |
| 4,664,208 A * | 5/1987 | Horiuchi et al. | ............... | 180/23 |
| 5,036,939 A | 8/1991 | Johnson et al. | | |
| 5,186,772 A * | 2/1993 | Nakasaki et al. | ............ | 152/516 |
| 5,314,239 A | 5/1994 | Edwards et al. | | |
| 5,697,671 A * | 12/1997 | Shavitz | .................... | 297/250.1 |
| 5,765,917 A | 6/1998 | Johnson | | |
| 5,845,918 A | 12/1998 | Grinde et al. | | |
| 6,073,719 A * | 6/2000 | Ohmika et al. | ............... | 180/219 |
| 6,241,301 B1 * | 6/2001 | Speth et al. | .................... | 296/75 |
| 6,270,106 B1 * | 8/2001 | Maki et al. | .................. | 280/291 |
| 6,491,124 B1 * | 12/2002 | Thompson et al. | .......... | 180/190 |
| 6,502,728 B2 * | 1/2003 | Savant | ........................ | 224/401 |
| 6,508,511 B1 * | 1/2003 | Kolpin | .................. | 297/256.16 |
| 6,672,916 B1 * | 1/2004 | Lent-Phillips et al. | ...... | 440/12.5 |

(Continued)

FOREIGN PATENT DOCUMENTS

CA    2467537    5/2003

(Continued)

*Primary Examiner*—Anne Marie M Boehler
(74) *Attorney, Agent, or Firm*—Black Lowe & Graham PLLC

(57) ABSTRACT

One embodiment of the invention is a multi-purpose vehicle having a frame, a suspension secured to the frame, four wheels tires secured to the suspension, and handlebars for steering the vehicle. The vehicle also includes a straddle mount seat secured to the frame with seating positions for a driver and a passenger of the vehicle. The seating position for the passenger is located rearward on the vehicle relative to the seating position of the driver. The vehicle also has foot and hand positions for the passenger. Optionally, the vehicle includes a backrest and armrests for the passenger.

14 Claims, 5 Drawing Sheets

U.S. PATENT DOCUMENTS

| | | | | |
|---|---|---|---|---|
| 6,705,680 B2 * | 3/2004 | Bombardier | | 298/17 R |
| 6,755,269 B1 * | 6/2004 | Davis et al. | | 180/89.1 |
| 6,793,108 B2 * | 9/2004 | Williams, Jr. | | 224/401 |
| 2002/0179358 A1 * | 12/2002 | Bombardier | | 180/233 |
| 2003/0102694 A1 * | 6/2003 | Rondeau et al. | | 296/195 |

FOREIGN PATENT DOCUMENTS

| | | |
|---|---|---|
| CA | 2306195 | 1/2004 |
| EP | 1157918 | * 11/2001 |
| WO | 00/76794 | 12/2000 |
| WO | 03/042026 | 5/2003 |

* cited by examiner

TANDEM FOUR-WHEEL VEHICLE

This application is being filed as a PCT international patent application in the name of Arctic Cat, Inc., a U.S. national corporation (applicant for all designated countries except the U.S.), and in the name of Ole Tweet, a U.S. citizen and resident (applicant for the U.S. designation), on Jul. 31, 2002, designating all countries.

BACKGROUND OF THE INVENTION

1. Field of the Invention

The present invention generally relates to four-wheel straddle mount vehicles. More specifically, the present invention relates to a four-wheel vehicle with a straddle mount seat that seats two passengers.

2. Related Art

All terrain vehicles (ATV's) are constructed for use in all kinds of uneven, rough and rocky terrain. Such vehicles have been adapted for transportation, utility and sport purposes. The vehicles generally include a frame that defines an engine compartment, an engine positioned within the engine compartment, a suspension system, a set of wheels secured to the suspension and powered by the engine, a set of handlebars, and a straddle mount seat. Typically, ATV's are designed to have a wheelbase and seat design for a single rider.

SUMMARY OF THE INVENTION

Generally, the present invention provides a multi-purpose vehicle (MPV) for use by two persons riding in tandem. One embodiment of the invention is a MPV having a frame, a suspension secured to the frame, four wheels secured to the suspension, handlebars for steering the vehicle and a straddle mount seat. The seat has seating positions for a driver and a passenger of the vehicle. The seat position for the passenger is located rearward on the vehicle relative to the seat position of the driver. The vehicle frame is generally designed to accommodate a projected weight of the driver alone or the combined weight of the driver and a passenger, as well as rated cargo weights.

The above summary of the present invention is not intended to describe each disclosed embodiment or every implementation of the present invention. The figures and detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, wherein like numerals represent like parts throughout several views, in which.

Figure 1:
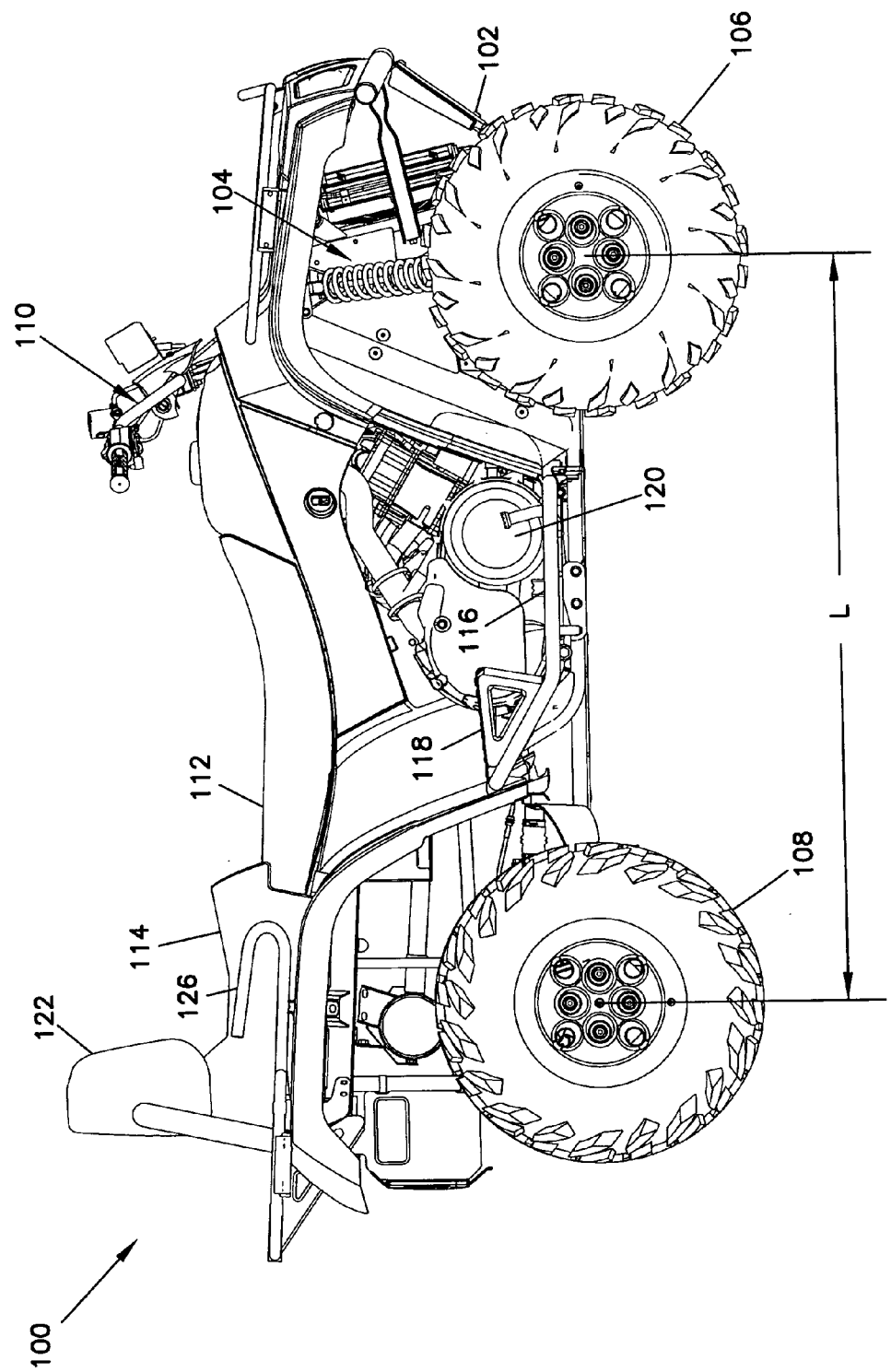
FIG. 1 is a side view of a multi-purpose vehicle, according to the invention.

While the invention is amenable to various modifications and alternative forms, the specifics thereof have been shown by way of example in the drawings and will be described in detail. It should be understood, however, that the intention is not to limit the invention to particular embodiments described. On the contrary, the invention is to cover all modifications, equivalents, and alternatives falling within the spirit and scope of the invention.

DETAILED DESCRIPTION OF THE PREFERRED EMBODIMENT

The present invention is applicable to a multi-purpose vehicle (MPV) that includes a straddle-mount seat, four wheels, handlebars for steering, and is suitable for use by two persons at the same time. In particular, the present invention is directed to a MPV with a straddle mount seat that includes a seating position for a driver and a seating position for a passenger that is located rearward of the driver's seating position. While the present invention may not be so limited, an appreciation of various aspects of the invention will be gained through a discussion of the examples provided below.

A MPV of the present invention overcomes many of the shortcomings of prior art straddle mount vehicles. Generally speaking, a MPV of the present invention that is capable of accommodating more than one person at a given time may include a longer wheelbase, footrests for two persons, handles for both passengers, and a seat that provides better stability and space for two persons.

One example of a MPV 100 of the present invention includes a frame 102, a front suspension 104, a rear suspension 105, front wheels 106, rear wheels 108, handlebars 110 for steering, and seat positions 112 and 114, as shown in FIGS. 1 to 4. MPV 100 also includes driver footrests 116, passenger footrests 118, and engine 120. The partial perspective view of FIG. 2 further illustrates the vehicle having a backrest 122 and handles 126 that may be associated with passenger seating position 114.

Figure 2:
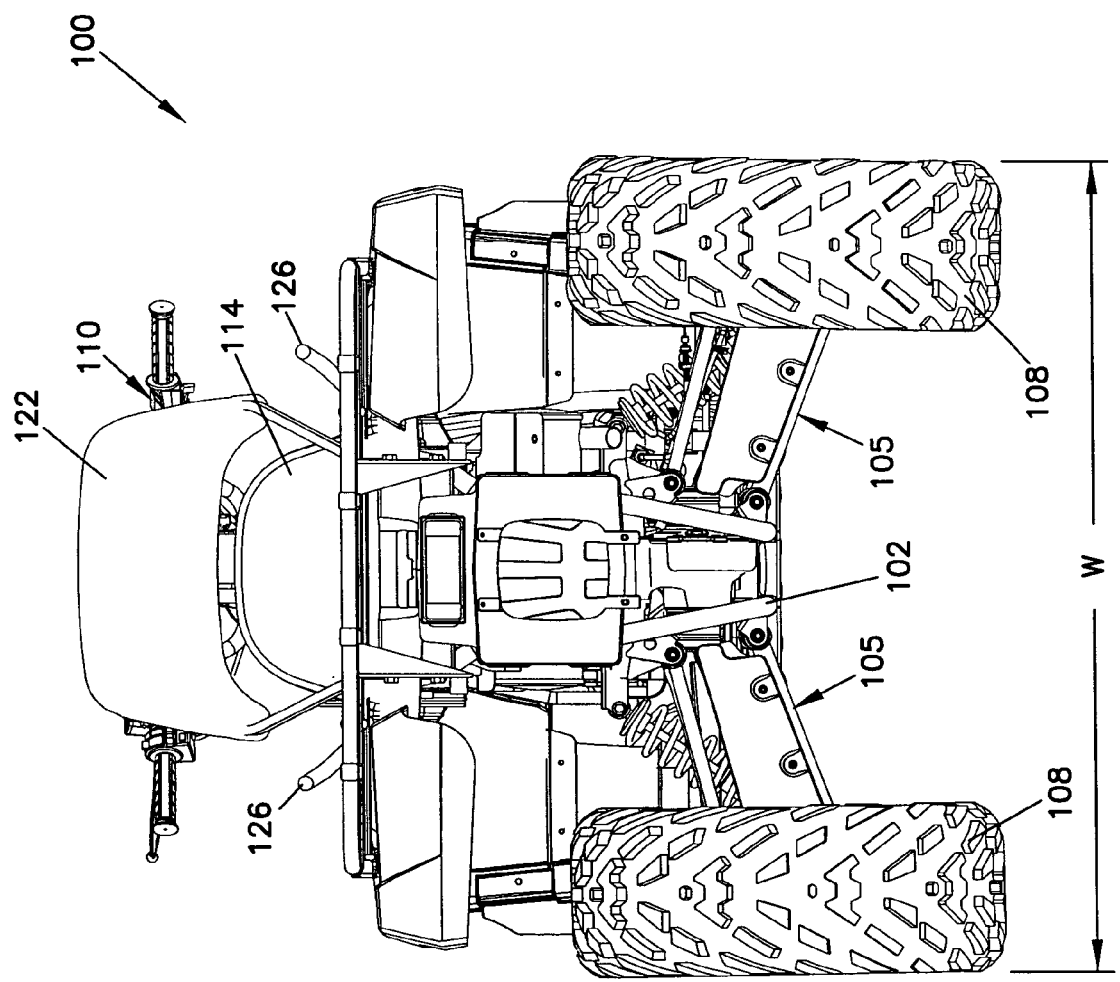
FIG. 2 is a rear view of a rear portion of the multi-purpose vehicle of FIG. 1.
Figure 4:
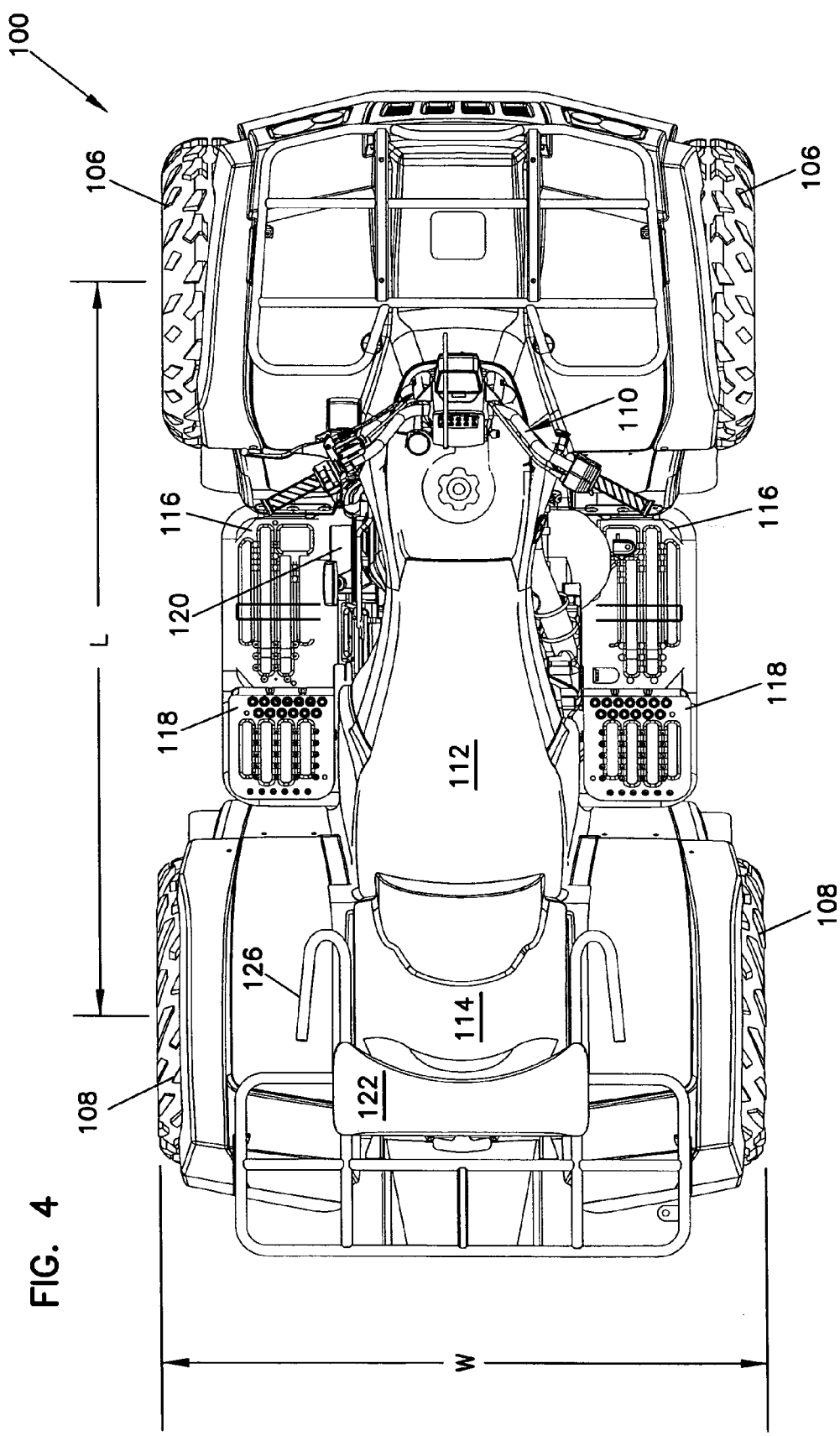
FIG. 4 is a top view of the multi-purpose vehicle of FIG. 1.

FIGS. 2 and 4 provide an illustration of a vehicle width W. FIGS. 1 and 4 illustrate a vehicle length L of the vehicle wheelbase.

Frame or chassis 102 of MPV 100 has a length, a width and a height that are generally discernible by the shape and size of the vehicle 100. Typically, straddle mount vehicle frames are designed so that the entire vehicle width is not wider than about 56 inches and most commonly about 44 to 47 inches. The MPV of the present invention may have an overall width of no more than about 48 inches. The frame of MPV 100 may be longer than single passenger straddle mount vehicle frames to better account for the additional bulk, weight and forces of two persons riding the vehicle.

Frame 102 is typically constructed of metal tubing members with a circular cross-section that are welded together. The tubing may be steel, aluminum, or a metal alloy that provides the necessary strength and durability. Frame 102 may be constructed of other shaped members that have rectangular, I-shaped or other cross-sections. Frame members may also be secured together using fasteners, adhesives, or other methods besides welding.

The frame 102 is secured to a front suspension 104 and a rear suspension 105 of vehicle 100. The front and rear suspensions act between frame 102 and wheels 106 and 108, respectively, in order to absorb some of the forces applied to the vehicle via the wheels or the vehicle passengers. Suspensions 104 and 105 may be designed to account for different forces that may be encountered by the front of the vehicle or the rear of the vehicle. For example, when a single person is riding vehicle 100 over a terrain, the amount and direction of forces exerted on suspension 104 at the front of the vehicle may be different from the amount and direction of forces exerted on suspension 105 at the rear of the vehicle. Also, when two passengers are riding vehicle 100, the amount of force exerted on rear suspension 105 may be larger than the amount of force exerted on front suspension 104. Thus, for these and many other reasons, front suspension 104 and rear suspension 105 may require different designs to account for the forces applied at or near the front or rear portions of vehicle 100.

MPV 100 includes four wheels; two front wheels 106 and two rear wheels 108, that typically include low-pressure tires mounted to wheel rims. The usual tire pressure for MPV 100 is less than 10 psi, generally 3-6 psi, but may be greater than 10 psi with some types of tires. Although wheels 106 and 108 are illustrated as having identical shapes and sizes in FIGS. 1-4, in alternative embodiments, the features of wheels 106 and 108 may vary. For example, front wheels 106 may have a smaller diameter, width, sidewall height, and tire pressure as well as a smaller rim diameter as compared to the features of rear wheels 108.

Handlebars 110 may be connected to front wheels 106 through a steering mechanism so that the direction in which handlebars 110 are turned directly correlates with the direction front wheels 106 are turned. Handlebars 110 are typically used for both steering the vehicle as well as mounting additional control features for the vehicle. For example, the vehicle brakes, starting button, headlight switches, speedometer, tachometer, horn, or other operating features of MPV 100 may be mounted to handlebars 110 for easy access by the vehicle driver.

MPV 100 also includes a vehicle seat that is divided into a distinct seating position for a driver 112 and a distinct tandem seating position for a passenger 114. The vehicle seat is a straddle-type seat that is sufficiently narrow to be straddled by a rider and a passenger. According to this embodiment, the seating position for the passenger 114 is positioned rearward on the vehicle relative to the seating position for the driver 112. Seating position 112 may accommodate a vehicle driver of various sizes and shapes by providing a relatively long seating area and a seating width suitable for straddling.

As illustrated in the Figures, passenger seating position 114 is positioned rearward of driver position 112. Seating position 114 may be either on the same horizontal plane or in a raised position relative to driver position 112. A raised position or plane may provide the passenger with a better view for anticipation of terrain. Passenger position 114 may further include a backrest 122 that provides back support for the passenger. Passenger position 114 may also include armrests 124 (see FIG. 5) and handles 126 that may improve stability and comfort for a passenger riding in that seating position. Passenger position 114 may also include a seating surface that is relatively concave in shape or that provides some sort of contoured surface and cushion for more comfortably seating a passenger of the vehicle. Both driver position 112 and passenger position 114 may be composed of a variety of different materials, such as, for example, an open cell foam covered with a vinyl material that has the properties of being waterproof and wear resistant.

MPV 100 is provided with a footrest that laterally extends on each side of the frame 102. An ergonomically positioned footrest is useful for a passenger of the vehicle to maintain stability and comfort on the vehicle and to keep a passenger's feet from contacting the ground over which the vehicle is riding or contacting the vehicle wheels or interfering with the operator's feet and legs. A vehicle footrest may include any number of shapes and sizes, such as the rectangular-shaped footrests 116 and 118 of vehicle 100, illustrated in FIGS. 1-4. Footrests 116 and 118 may be composed of a metal or polymer material and are formed in a shape, for example, in the shape of a flat plate, or a mesh design that allows for loose material to pass through the footrest.

Figure 3:
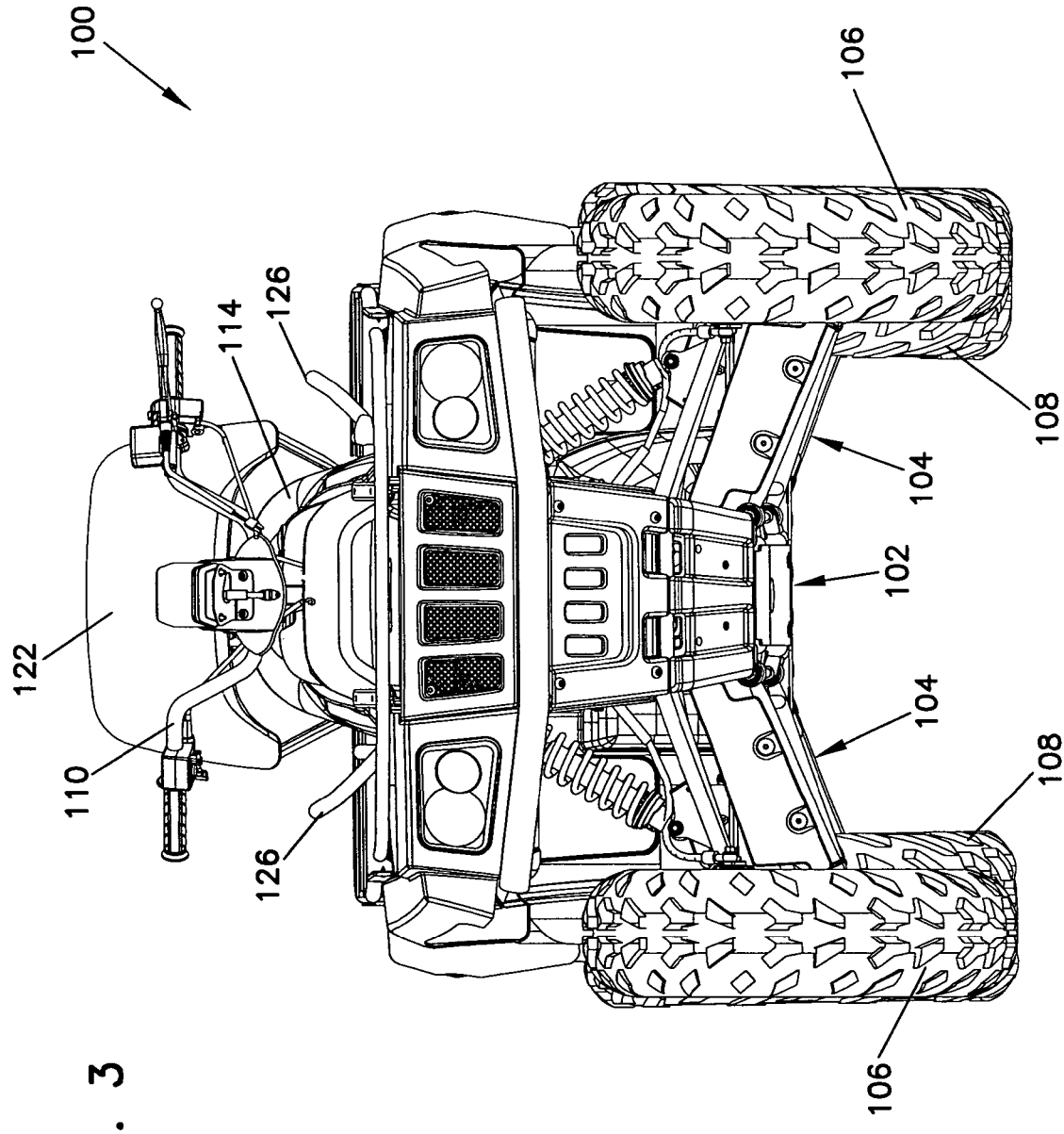
FIG. 3 is a front view of the multi-purpose vehicle of FIG. 1.

As illustrated in FIGS. 1-3, driver footrest 116 is positioned frontward of passenger footrest 118 in order to correlate with the seating positions of the driver and the passenger on the vehicle. Passenger footrest 118 is generally positioned between front and rear wheels 106 and 108, respectively. Footrest 118 may extend in a substantially horizontal plane, or may extend in the same plane (whether the plane is horizontal or slanted relative to a horizontal plane) as driver footrest 116, or may extend in a plane vertically higher than footrest 116. Passenger footrest 118 may also be tilted or slanted upward from back to front relative to a horizontal plane of the vehicle (see FIG. 5). Slanted or tilted footrests may assist the passenger in maintaining a stable position on vehicle 100, as well as providing a more comfortable position for the passenger's feet as the passenger sits in seating position 114. Footrests 116 and 118 may be made from any suitable material. If desired, the footrests may be fabricated from metal components, or they may be injection molded from a polymer material having desirable characteristics for a footrest.

MPV 100 may further include handles 126 mounted at a rear position on the vehicle for use by a passenger of the vehicle. The term "handles" as used herein is intended to have a broad definition that includes, for example, handholds and the like.

Handles 126 may serve multiple purposes, such as a handle for a passenger to grasp for stability and bracing to help cushion when traveling over rough terrain, a rack for carrying objects on the vehicle, or a platform for supporting a portion of a person's body when mounting the vehicle. Handles 126 may be positioned adjacent seating position 114, for example, on a fender of MPV 100, as an extension from seating position 114, or near a rear portion of MPV 100 as part of a rack or bumper of the vehicle. Handles 126 may also be removable from the vehicle and interchanged with different sizes and designs of handles. As seen in FIGS. 1-4, the grippible portions of handles 126 are laterally adjacent to the seating position for the passenger, substantially inboard of the outer sides of the rear fenders and at least as far forward as an approximate longitudinal mid-region of the passenger seating position. Handles 126 may be made of a variety of different materials and have a variety of different designs, for example, handle 126 may be made of hollow metallic or polymer tubing, or the like, formed in the shape of a handle, or may be made of a fabric, flexible polymer material, or the like, that may be more conforming to a passenger's grip. Handles 126 may extend partially in a horizontal direction and partially in a more vertical direction as shown in FIGS. 1-4.

MPV 100 may be powered by an engine 120 that activates a vehicle transmission, which in turn, powers the wheels of the vehicle. The vehicle transmission may be a manual transmission, a continuously variable transmission (CVT), or a hydraulic transmission.

The vehicle frame width and length, as discussed above, may be relevant to the stability of MPV 100. In the case where a vehicle is designed for more than one passenger, such as in the present invention, dimensions of the vehicle may need to be altered as compared to single passenger straddle mount vehicles in order to provide the necessary support and stability of the vehicle. Of importance to this goal is the wheelbase length L, shown in FIGS. 1 and 4. The wheelbase length of the vehicle is typically measured between an axle extending through front wheels 106 of the vehicle and an axle extending through rear wheels 108 of the vehicle. A single passenger straddle mount vehicle typically may have a wheelbase length of less than 50 inches. Wheelbase length L of the present invention is typically more than about 52 inches and typically less than about 66 inches, preferably at least 54 inches, and most preferably about 58 to 64 inches. Generally, wheelbase length L of the present invention is about 15% to 20% longer than a single passenger straddle mount vehicle. The additional wheelbase length may be required to allow for passenger seating position 114 on vehicle frame 102 and also provide adequate space for passenger footrests 116 and 118 between front and rear wheels 106 and 108.

It is anticipated that the additional wheelbase length L of vehicle 100 may also provide additional stability for the vehicle, particularly in the front-to-back direction. However, additional wheelbase length may increase a turning radius of the vehicle having a steering mechanism of a typical single passenger straddle mount vehicle. An increased turning radius for a MPV with a longer wheelbase may be remedied in part by increasing a turning angle of the wheels or by altering the shape and position of front wheels 106.

Changes to the wheelbase length L of vehicle 100 as compared to typical straddle mount vehicles, may also provide for increased spatial capacity for engine 120 and an associated transmission for the vehicle. Added space for these components may reduce limitations in the size and shape of engine 120 and an associated transmission for the vehicle.

Another design consideration for many straddle mount vehicles is the vehicle's pitch stability. Pitch stability relates generally to the vehicle's stability in the front-to-back direction. Pitch stability is commonly quantified using a pitch stability coefficient that takes into consideration several vehicle parameters. First, the vehicle wheelbase (L) and front and rear weights ($W_f$ and $W_r$, respectively) are used to determine a value $L_1$ as follows:

$$L_1 = \frac{W_f}{W_f + W_r} L$$

(where $W_f$ is the sum of the front tire loads and $W_r$ is the sum of the rear tire loads). Next, the vertical height between the rear axle center and the ground ($R_r$) and a balancing angle alpha ($\alpha$), together with $L_1$ are used to calculate the coefficient $K_p$. The angle alpha ($\alpha$) is determined by first placing the vehicle on a level surface then rotating the front of the vehicle upward about the rear axle (without setting a park brake or using stops of any kind) until the vehicle is balanced on the rear tires. The stability coefficient is calculated using the following formula:

$$K_p = \frac{L_1 \tan(\alpha)}{L_1 + R_r \tan(\alpha)}$$

The pitch stability coefficient of MPV 100 is at least 1.0

Figure 5:
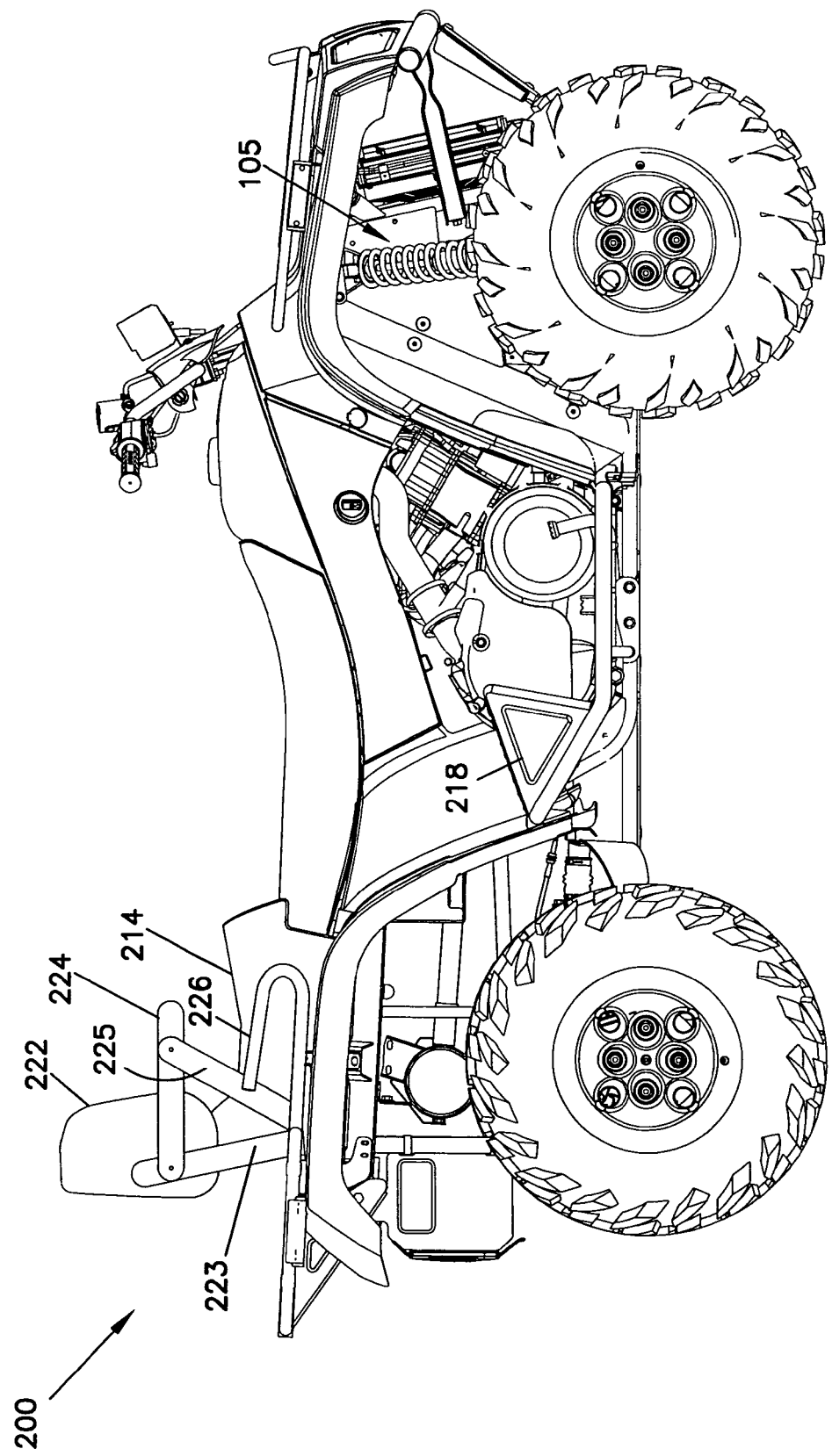
FIG. 5 is a side view of a multi-purpose vehicle, according to the invention.

FIG. 5 illustrates an MPV 200 having several alternative features to those features of MPV 100. MPV 200 includes a passenger footrest 218 that is slanted downward from front to back at an angle relative to a horizontal plane. The angle of slant as well as the size and shape of footrest 218 may vary. A slanted passenger footrest may be more ergonomic for a passenger sitting in a passenger seating position 214 of the MPV.

MPV 200 also includes an armrest 224 positioned adjacent the passenger seating position 214. The armrest 224 may be supported by a support member 225 that extends generally downward toward the vehicle frame, and may be further supported by a backrest support member 223. A second armrest may be positioned adjacent the passenger seating position 214 on an opposite side of the MPV from the position of armrest 224 shown in FIG. 5.

MPV 200 may include a handle 226, with an alternative design to handle 126, positioned adjacent seating position 214. Handle 226 may be integral with the rack or bumper of MPV 200, or may be mounted to the vehicle independent of the rack and bumper. Handle 226 includes a generally horizontal portion and an angled portion, but may, in other embodiments, include a variety of different shapes and sizes. A second handle may be positioned on the opposite side of the MPV from the position of handle 226 shown in FIG. 5.

MPV 200 may include a backrest 222 supported by support member 223 and positioned to support a passenger of the vehicle sitting in passenger seating position 214. In other embodiments, backrest 222 may be vertically adjustable or tiltable to better conform to the back of a passenger sitting in passenger seating position 214. Backrest 222, in other embodiments, may be mounted to MPV 200 independent of armrest 224 or may be mounted without any armrest feature associated with the vehicle.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A multi-purpose vehicle, comprising:
a frame;
a suspension secured to the frame;
four wheels secured to the suspension;
handle bars for steering the vehicle;
a straddle mount seat secured to the frame, the seat having seating positions for a driver and a passenger of the vehicle, the position for the passenger being located rearward and significantly above the seating position for the driver;
rear wheel fenders spaced apart from the rear two wheels, each rear wheel fender having a substantially planar portion located at least as far forward as an approximate longitudinal mid-region of the passenger seating position;
a cargo rack secured to the vehicle rearward of the seating position for the driver, the cargo rack having left and right handles removably coupled to the vehicle, the handles extending upwardly from a portion of a rack main deck below the passenger seating position and being positioned vertically adjacent to upwardly facing surfaces defining the substantially planar portions of rear wheel fenders and the handles being at least as far forward as the approximate longitudinal mid-region of the passenger seating position, each handle having a grippable portion positioned laterally adjacent to the seating position for the passenger and vertically above the seating position for the driver, substantially inboard of the outer sides of the rear wheel fenders, and
a pair of footrests for the driver and a separate pair of footrests for the passenger, wherein the footrests for the passenger are raised with respect to the footrests for the driver.

2. The multi-purpose vehicle of claim 1, wherein the passenger footrests are tilted upward from back to front with respect to a horizontal plane.

3. The multi-purpose vehicle of claim 1, wherein the vehicle has a wheelbase length of at least 54 inches.

4. The multi-purpose vehicle of claim 2 wherein the wheels comprise a pair of front wheels and the pair of rear wheels, and the passenger footrests are positioned between the front and rear pair of wheels.

5. The multi-purpose vehicle of claim 1 wherein the seating position for the passenger includes a backrest.

6. The multi-purpose vehicle of claim 1 wherein the seating position for the passenger includes armrests.

7. The multi-purpose vehicle of claim 1 wherein the wheels comprise rims mounted with low-pressure tires.

8. The multi-purpose vehicle of claim 1 wherein the wheelbase length is 54 to 64 inches.

9. A multi-purpose vehicle, comprising:
a frame;
a suspension secured to the frame;
four wheels secured to the suspension;
handle bars for steering the vehicle;
a straddle mount seat secured to the frame, the seat having a driver seat and a passenger seat located rearward and raised substantially above the driver seat so as to provide a passenger a view of oncoming terrain;
rear wheel fenders spaced apart from the rear two wheels, each rear wheel fender having a portion located at least as far forward as an approximate longitudinal mid-region of the passenger seat;
a first handle and a second handle extending laterally and upwardly from a lower portion of either side of the passenger seat, the handles positioned vertically above the rear wheel fenders and said first and second handles further positioned at least as far forward as the approximate longitudinal mid-region of the passenger seat, each handle having respective grippable portions that extend upward proximate to and spaced from the side of the passenger seat for use as passenger handles; and
footrests for the driver and a separate pair of footrests for the passenger, the passenger footrests being raised with respect to the footrests for the driver.

10. The multi-purpose vehicle of claim 9, wherein the footrests for the passenger are tilted upward from back to front with respect to a horizontal plane, the raise in the passenger footrests above the driver footrests being similar to the amount of passenger seating position raise above the driver seating position.

11. The multi-purpose vehicle of claim 9, wherein the handles are formed of tubular metal.

12. The multi-purpose vehicle of claim 11, wherein the tubular metal has at least one of a round and square cross-section.

13. The multi-purpose vehicle of claim 9, wherein the respective grippable portions of the first and second handles include upwardly bent portions.

14. The multi-purpose vehicle of claim 9, wherein the respective grippable portions of the first and second handles include end portions that extend upward at an angle relative to the substantially planar portions of the rear wheel fenders.

* * * * *